United States Patent
Sasaki

(10) Patent No.: US 10,482,447 B2
(45) Date of Patent: Nov. 19, 2019

(54) RECOGNITION SYSTEM, INFORMATION PROCESSING APPARATUS, AND INFORMATION PROCESSING METHOD

(71) Applicant: TOSHIBA TEC KABUSHIKI KAISHA, Tokyo (JP)

(72) Inventor: Yuta Sasaki, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 183 days.

(21) Appl. No.: 15/603,662

(22) Filed: May 24, 2017

(65) Prior Publication Data
US 2017/0344972 A1    Nov. 30, 2017

(30) Foreign Application Priority Data

May 31, 2016    (JP) ................................. 2016-109290

(51) Int. Cl.
| | | |
|---|---|---|
| *G06K 9/00* | (2006.01) | |
| *G06Q 20/20* | (2012.01) | |
| *G07G 1/00* | (2006.01) | |
| *G06K 9/62* | (2006.01) | |

(Continued)

(52) U.S. Cl.
CPC .............. *G06Q 20/208* (2013.01); *G06K 9/18* (2013.01); *G06K 9/46* (2013.01); *G06K 9/627* (2013.01);
(Continued)

(58) Field of Classification Search
CPC ............... G06Q 20/208; G06Q 30/018; G06K 2209/17; G06K 9/00; G06K 2209/27; G06K 9/00288; G06K 9/00536; G06K 9/4604; G06K 9/46; G06T 2207/30128; G06T 2207/10016; G06T 7/001; G06T 7/11; G06T 7/194; G06T 7/246; G06T 1/0021;
(Continued)

(56) References Cited

U.S. PATENT DOCUMENTS 6,005,959 A * 12/1999 Mohan ................. G01B 11/024
                                                                        348/89
10,108,830 B2 * 10/2018 Kakino .................... G06K 9/00
(Continued)

FOREIGN PATENT DOCUMENTS

EP        3021299 A1    5/2016

OTHER PUBLICATIONS https://arxiv.org/pdf/1510.04074.pdf (Year: 2015).*
(Continued)

*Primary Examiner* — Nathan A Mitchell
*Assistant Examiner* — Dana Amsdell
(74) *Attorney, Agent, or Firm* — Kim & Stewart LLP

(57) ABSTRACT

In one embodiment, a recognition system has an imaging device, a storage device, and a first processor. The first processor extracts a feature amount of an article contained in image data outputted by the imaging device. The first processor recognizes a commodity to which the detected article corresponds, based on similarities between feature amounts for collation of a first commodity and a second commodity stored in the storage device and the extracted feature amount, and selects the recognized commodity from the storage device, as the commodity to which the detected article corresponds, provided that the recognized corresponding commodity is not the first commodity.

10 Claims, 8 Drawing Sheets

| COMMODITY CODE | COMMODITY INFORMATION ||| ILLUSTRATION IMAGE | FEATURE AMOUNT FOR COLLATION | RECOGNITION CLASSIFICATION |
|---|---|---|---|---|---|---|
| | COMMODITY CLASSIFICATION | COMMODITY NAME | UNIT PRICE | | | |
| 0001 | CLASSIFICATION A | COMMODITY A | 100 YEN | | FEATURE AMOUNT A | GENERIC OBJECT RECOGNITION |
| 0002 | CLASSIFICATION A | COMMODITY B | 150 YEN | | FEATURE AMOUNT B | CODE SYMBOL RECOGNITION |
| ⋮ | ⋮ | ⋮ | ⋮ | ⋮ | ⋮ | ⋮ |

(51) Int. Cl.
*G06K 9/18* (2006.01)
*G06K 9/46* (2006.01)
*G06K 9/68* (2006.01)
*G06F 16/583* (2019.01)

(52) U.S. Cl.
CPC ............ *G06K 9/6215* (2013.01); *G06K 9/685* (2013.01); *G06Q 20/201* (2013.01); *G07G 1/0063* (2013.01); *G06F 16/5854* (2019.01); *G06K 2209/17* (2013.01)

(58) Field of Classification Search
CPC ............... G06T 1/20; G06T 2201/0064; G06T 2207/10004; G06T 2207/10024; G06T 2207/20016; G06T 2207/20021; G06T 2207/20056; G06T 2207/30232; G06T 5/50; G06T 7/12; G06T 7/269; G06T 7/30; G06T 7/33; G06T 7/37; G06T 7/62; G06T 7/64; G07G 1/0045; G07G 1/0063
See application file for complete search history.

(56) References Cited

U.S. PATENT DOCUMENTS

| | | | | |
|---|---|---|---|---|
| 2013/0103509 A1* | 4/2013 | Naito | ............... | G07G 1/0054 705/16 |
| 2013/0182122 A1* | 7/2013 | Naito | ............... | H04N 5/23296 348/169 |
| 2013/0208122 A1* | 8/2013 | Iizaka | ............... | H04N 7/18 348/150 |
| 2013/0262263 A1* | 10/2013 | Watanabe | ............... | G06Q 30/0633 705/26.8 |
| 2013/0279748 A1* | 10/2013 | Hastings | ............... | G06K 9/46 382/103 |
| 2014/0021258 A1* | 1/2014 | Olmstead | ............... | G06K 7/10544 235/462.41 |
| 2014/0064559 A1 | 3/2014 | Sugasawa et al. | | |
| 2014/0126775 A1* | 5/2014 | Kakino | ............... | G06K 9/00 382/103 |
| 2014/0140574 A1* | 5/2014 | Takeno | ............... | G06K 9/00671 382/103 |
| 2014/0153786 A1* | 6/2014 | Takeno | ............... | G07G 1/0054 382/110 |
| 2015/0063638 A1 | 3/2015 | Kakino | | |
| 2016/0140534 A1 | 5/2016 | Iizaka | | |

OTHER PUBLICATIONS

Extended European Search Report dated Oct. 27, 2017, filed in counterpart European Patent Application No. 17172813.2, 9 pages (with translation).

* cited by examiner

| COMMODITY CODE | COMMODITY INFORMATION | | | ILLUSTRATION IMAGE | FEATURE AMOUNT FOR COLLATION | RECOGNITION CLASS-IFICATION |
|---|---|---|---|---|---|---|
| | COMMODITY CLASS-IFICATION | COMMODITY NAME | UNIT PRICE | | | |
| 0001 | CLASS-IFICATION A | COMMODITY A | 100 YEN |  | FEATURE AMOUNT A | GENERIC OBJECT RECOGNITION |
| 0002 | CLASS-IFICATION A | COMMODITY B | 150 YEN |  | FEATURE AMOUNT B | CODE SYMBOL RECOGNITION |
| ⋮ | ⋮ | ⋮ | ⋮ | ⋮ | ⋮ | ⋮ |

RECOGNITION SYSTEM, INFORMATION PROCESSING APPARATUS, AND INFORMATION PROCESSING METHOD

CROSS-REFERENCE TO RELATED APPLICATION

This application is based upon and claims the benefit of priority from the prior Japanese Patent Application No. 2016-109290, filed on May 31, 2016, the entire contents of which are incorporated herein by reference.

FIELD

Embodiments described herein relate generally to a recognition system, an information processing apparatus, and an information processing method

BACKGROUND

Conventionally, in a store such as a supermarket, a system which images a commodity attached with a code symbol such as a bar-code, and performs sales registration of a commodity recognized using a commodity code extracted from the code symbol has been used.

In addition, recently, an art relating to generic object recognition (object recognition) which recognizes an imaging object article in accordance with similarities is present. Here, the similarities have been obtained by comparing a feature amount of an imaging object article which has been extracted from image data obtained as an imaging result by an image sensor device, with feature amounts for collation in a previously prepared dictionary. And a POS (Point Of Sales) system provided with the both functions of a sales registration function using the above-described code symbol, and a sales registration function using the object recognition has been proposed.

Incidentally, in the POS system provided with the both functions, when a code symbol is attached to a commodity, it is required to recognize the relevant commodity using a commodity code, for the reason to prevent erroneous recognition. However, in the POS system, even with respect to a commodity attached with a code symbol, when similarities with feature amounts for collation become not less than a threshold value, the relevant commodity might be recognized using the object recognition. Because recognition of a commodity attached with a code symbol using the object recognition like this is not an originally assumed recognition method, there may be a case in which the commodity is erroneously recognized.

DETAILED DESCRIPTION

Figure 1:
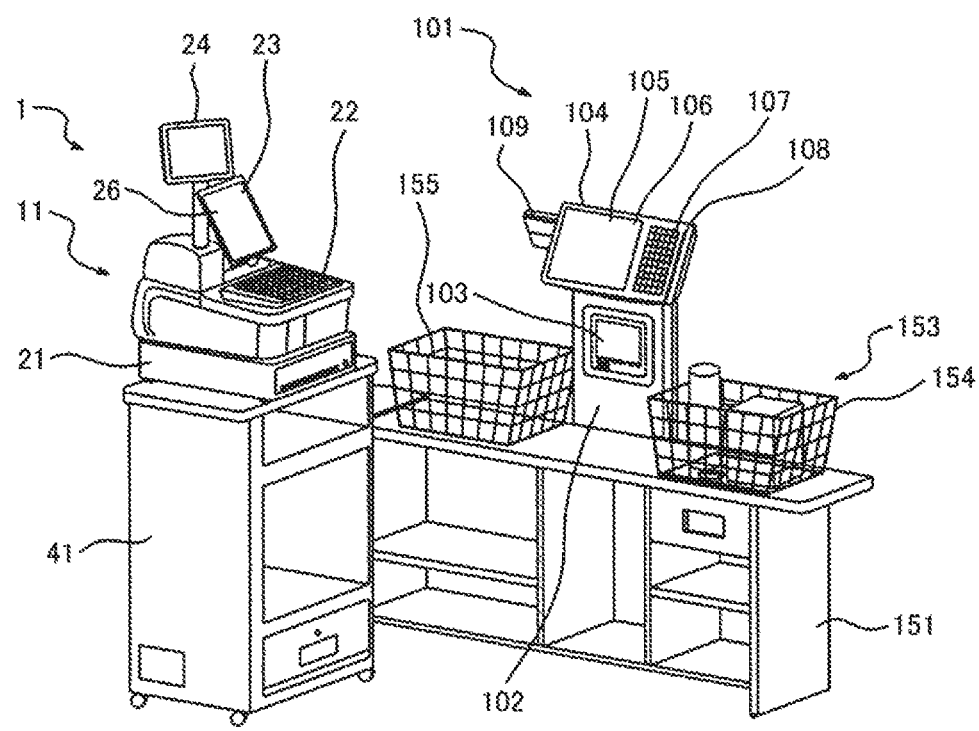
FIG. 1 is a perspective view showing an example of a checkout system according to an embodiment.

According to one embodiment, a recognition system has an imaging device, a storage device, and a first processor.

The imaging device images an image of a prescribed imaging area, to output image data.

The storage device stores commodities including a first commodity attached with identification information and a second commodity other than the first commodity and feature amounts for collation of these commodities.

The first processor detects an article contained in the image data outputted by the imaging device. The first processor extracts a feature amount of the detected article from the image data. The first processor calculates similarities between the feature amounts for collation of the first commodity and the second commodity stored in the storage device and the extracted feature amount. The first processor recognizes a commodity to which the detected article corresponds, based on the calculated similarities. Further, the first processor selects the recognized commodity from the storage device, as the commodity to which the detected article corresponds, provided that the recognized corresponding commodity is not the first commodity.

Hereinafter, a recognition system, an information processing apparatus, an information processing method and a program thereof according to further embodiments will be described with reference to the drawings. The embodiment described herein is an embodiment of a recognition system, an information processing apparatus, an information processing method, and a program, and the configuration and specification thereof are not limited. The present embodiment is an example in which an information processing apparatus is applied to a checkout system installed in a store such as a supermarket. In the drawings, the same symbols indicate the same or similar portions.

FIG. 1 is a perspective view showing an example of a checkout system 1 according to an embodiment. The checkout system 1 has a commodity reading apparatus 101 which reads information relating to a commodity, and a POS (Point Of Sales) terminal 11 which performs registration and settlement (hereinafter may be called sales registration) of a commodity relating to one transaction. Hereinafter, an example in which the POS terminal 11 is applied as an information processing apparatus according to the present embodiment will be described. In addition, an example in which an object article of generic object recognition is a commodity will be described, but the object article may be an article other than a commodity.

The POS terminal 11 is placed on the upper surface of a drawer 21 on the checkout table 41. An opening operation of the drawer 21 is controlled by the POS terminal 11. The POS terminal 11 has a keyboard 22 to be operated by an operator (a salesclerk, for example) on the upper surface thereof. The POS terminal 11 has a first display 23 which displays various information toward the operator at a more back side than the keyboard 22 seen by the operator who operates the keyboard 22. The first display 23 has a touch panel 26 for accepting various operations. The POS terminal 11 has a second display 24 which is rotatably erected at a further back side than the first display 23. The second display 24 shown in FIG. 1 faces a front side in FIG. 1, but is rotated so as to face a back side in FIG. 1, to display various information to a customer.

A laterally long table-like counter table 151 is arranged so as to form an L-letter with the checkout table 41 on which the POS terminal 11 is placed. A shopping basket 153 for housing a commodity is placed on the counter table 151. In addition, the shopping basket 153 is not limited to a basket-like thing, but may be a tray or the like. Or, the shopping basket 153 may be a box-shaped or a bag-shaped thing or the like. The shopping basket 153 includes a first shopping basket 154 which a customer has brought in, and a second shopping basket 155 which is placed at a position to sandwich the commodity reading apparatus 101 with the first shopping basket 154.

The commodity reading apparatus 101 connected to the POS terminal 11 so that data can be transmitted/received therebetween is placed on the counter table 151. The commodity reading apparatus 101 has a thin rectangular housing 102. The housing 102 has a reading window 103 at the front surface thereof. An operation device 104 is attached to the upper portion of the housing 102.

The operation device 104 has a first display 106 having a surface on which a touch panel 105 is laminated. The commodity reading apparatus 101 has a keyboard 107 next to the right side of the first display 106. The commodity reading apparatus 101 has a card reading groove 108 of a card reader 111 (refer to FIG. 2) provided next to the right side of the keyboard 107. The commodity reading apparatus 101 has a second display 109 which is provided at a left back side of the rear surface of the operation device 104 seen by the operator and provides information toward a customer.

The commodity reading apparatus 101 has a commodity reading device 110 (refer to FIG. 2) inside the housing 102. The commodity reading apparatus 101 has an imaging device 164 (refer to FIG. 2) at a back side of the reading window 103.

A commodity relating to one transaction is housed in the first shopping basket 154. An operator who operates the commodity reading apparatus 101 moves the commodity in the first shopping basket 154 into the second shopping basket 155. During this moving process, the operator puts the commodity over the reading window 103 of the commodity reading apparatus 101. At this time, the imaging device 164 (refer to FIG. 2) arranged in the reading window 103 images the commodity.

Figure 2:
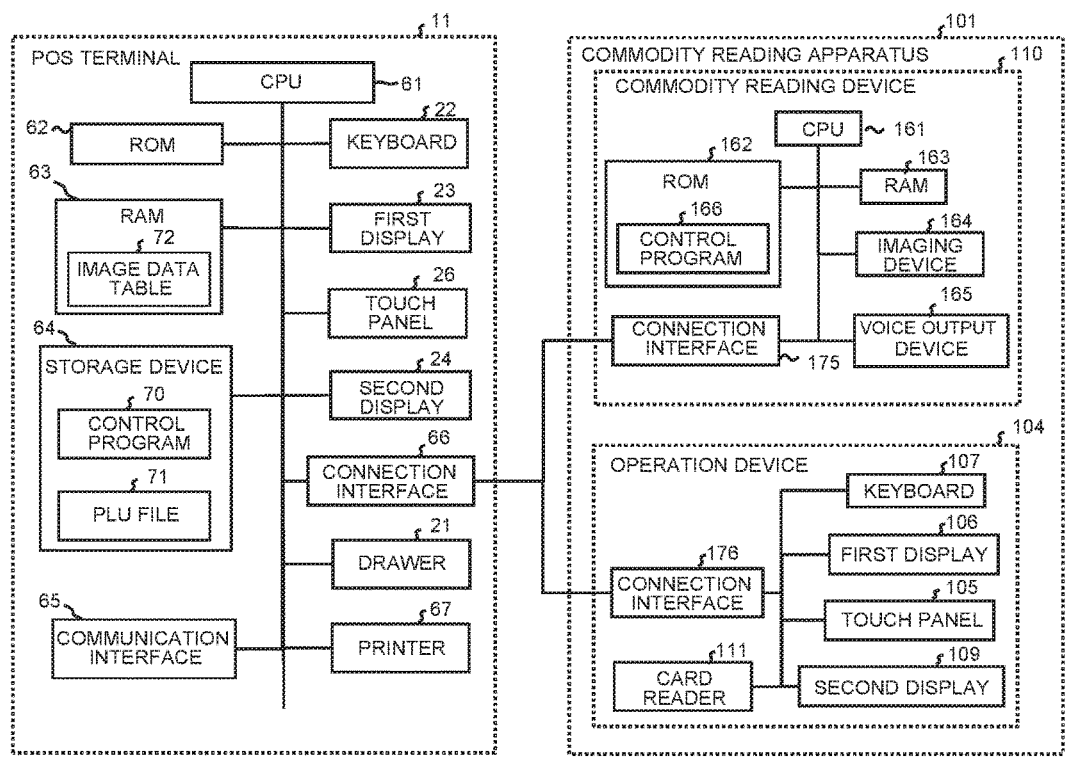
FIG. 2 is a block diagram showing a hardware configuration of the POS terminal and the commodity reading apparatus according to the embodiment.

FIG. 2 is a block diagram showing an example of a hardware configuration of the POS terminal 11 and the commodity reading apparatus 101. The POS terminal 11 has a first processor 61, a ROM (Read Only Memory) 62, a RAM (Random Access Memory) 63, a storage device 64, a communication interface 65, the keyboard 22, the first display 23, the touch panel 26, the second display 24, a connection interface 66, the drawer 21, and a printer 67. The first processor 61, the ROM 62, the RAM 63, the storage device 64, the communication interface 65, the keyboard 22, the first display 23, the touch panel 26, the second display 24, the connection interface 66, the drawer 21, and the printer 67 are connected to each other via a bus.

The first processor 61 is a CPU (Central Processing Unit), for example. Hereinafter the first processor 61 is called a CPU 61. The CPU 61 totally controls an operation of the POS terminal 11. The ROM 62 stores various programs and data. The RAM 63 temporarily stores various programs, and rewritably stores various data. In addition, the RAM 63 stores an image data table 72 described later. In addition, the image data table 72 is stored not only in the RAM 63, but may be stored in another storage medium such as the storage device 64, or may be stored in another device such as a store server or the like.

The keyboard 22 has various keys for operating the POS terminal 11.

The storage device 64 is a non-volatile storage device such as an HDD (Hard Disk Drive), or an SSD (Solid State Derive). The storage device 64 stores a control program 70 and a PLU file 71. In addition, the PLU file 71 is stored not only in the storage device 64, but may be stored in another storage medium, or may be stored in another device such as a store server or the like.

The control program 70 includes an operating system and a program for realizing a function which the POS terminal 11 has, for example. In the control program 70, a program for realizing a characteristic function according to the present embodiment is included.

Figure 3:
FIG. 3 is an explanation diagram showing an example of a data configuration of the PLU file according to the embodiment.
Figure 3:

The PLU file 71 is a commodity file which stores information relating to sales registration of the commodity, for each of various commodities sold in the store. Here, FIG. 3 is an explanation diagram showing an example of a data configuration of the PLU file 71. The PLU file 71 stores a commodity code, commodity information, an illustration image, a feature amount for collation, and a recognition classification for each commodity in association with each other. The commodity code is identification information which can identify the commodity. The commodity information includes a commodity classification to which the commodity belongs, a commodity name, a unit price and so on. The illustration image is image data indicating the commodity. The feature amount for collation is an amount obtained by parameterizing features of appearance, such as a standard shape, a color shade of the surface, a pattern, and a concave/convex state of the commodity. In addition, the feature amount for collation is data for collation used for determination of a similarity described later. The recognition classification is information for instructing a recognition method used for recognition of the commodity. The recognition method includes generic object recognition and code symbol recognition. The generic object recognition is a method for recognizing a commodity using generic object recognition. The code symbol recognition is a method for recognizing a commodity by reading a commodity code which a code symbol such as a bar-code or a two-dimensional code indicates. In the recognition classification, any one recognition method of the generic object recognition or the code symbol recognition is set. In other words, the recognition classification is a setting in which whether or not a code symbol is attached to the commodity is shown. Accordingly, the code symbol recognition is set for a commodity attached with a code symbol. On the other hand, the generic object recognition is set for a commodity not attached with a code symbol. In addition, the feature amount for collation and the recognition classification may be stored in a file different from the PLU file 71.

Returning to FIG. 2, the communication interface 65 is connected to the CPU 61 of the POS terminal 11. The communication interface 65 is an interface for communicating with an external device such as a store computer, via a network.

The connection interface 66 is an interface for connecting the POS terminal 11 to the commodity reading apparatus 101. The connection interface 66 connects the POS terminal 11 to the commodity reading apparatus 101, to input image data to be outputted by the imaging device 64, for example. The printer 67 prints transaction content in one transaction on a receipt sheet.

The commodity reading device 110 of the commodity reading apparatus 101 has a second processor 161, a ROM 162, a RAM 163, the imaging device 164, a voice output device 165, and a connection interface 175. The second processor 161, the ROM 162, the RAM 163, the imaging device 164, the voice output device 165, and the connection interface 175 are connected to each other via a bus.

The second processor 161 is a CPU, for example. Hereinafter, the second processor 161 is called a CPU 161. The CPU 161 totally controls an operation of the commodity reading apparatus 101. The ROM 162 stores various programs and data. The RAM 163 temporarily stores various programs, and rewritably stores various data.

The ROM 162 stores a control program 166. The control program 166 includes an operating system and a program for realizing a function which the commodity reading apparatus 101 has, for example. In the control program 166, a program for realizing a characteristic function according to the present embodiment is included.

The imaging device 164 has an image sensor (not shown) such as a color CCD image sensor or a color CMOS image sensor, and a light source (not shown) such as an LED. And the imaging device 164 operates under the control of the CPU 161. The imaging device 164 images a prescribed imaging area via the reading window 103, and outputs image data. For example, the imaging device 164 images the imaging area at a frame rate of 30 fps (Frame Per Second) or the like, and outputs image data of the imaging area. The imaging device 164 sequentially images imaging areas, and stores the outputted image data in the RAM 163.

The voice output device 165 has a voice circuit for generating a previously set alarm sound or the like, a speaker and so on. The voice output device 165 performs notification by alarm sound or voice under the control of the CPU 161.

The connection interface 175 is an interface for connecting the commodity reading device 110 to the POS terminal 11 and an operation device 104.

The operation device 104 of the commodity reading apparatus 101 has a connection interface 176, the keyboard 107, the first display 106, the touch panel 105, the second display 109, and the card reader 111. The connection interface 176, the keyboard 107, the first display 106, the touch panel 105, the second display 109, and the card reader 111 are connected to each other via a bus.

The connection interface 176 is an interface for connecting the operation device 104 to the POS terminal 11 and the commodity reading device 110.

The card reader 111 is a device which executes reading of information which a storage medium of a card used for settlement, such as a credit card, stores. The card reader 111 executes reading of the information which the storage medium of the card inserted in the card reading groove 108 stores.

The operation device 104 is controlled of its operation by the CPU 161 of the commodity reading device 110 or the CPU 61 of the POS terminal 11.

Next, the characteristic functions which the respective devices of the checkout system 1 have will be described. Here, FIG. 4 is a block diagram showing a configuration of the characteristic functions which the respective devices of the checkout system 1 have.

Figure 4:
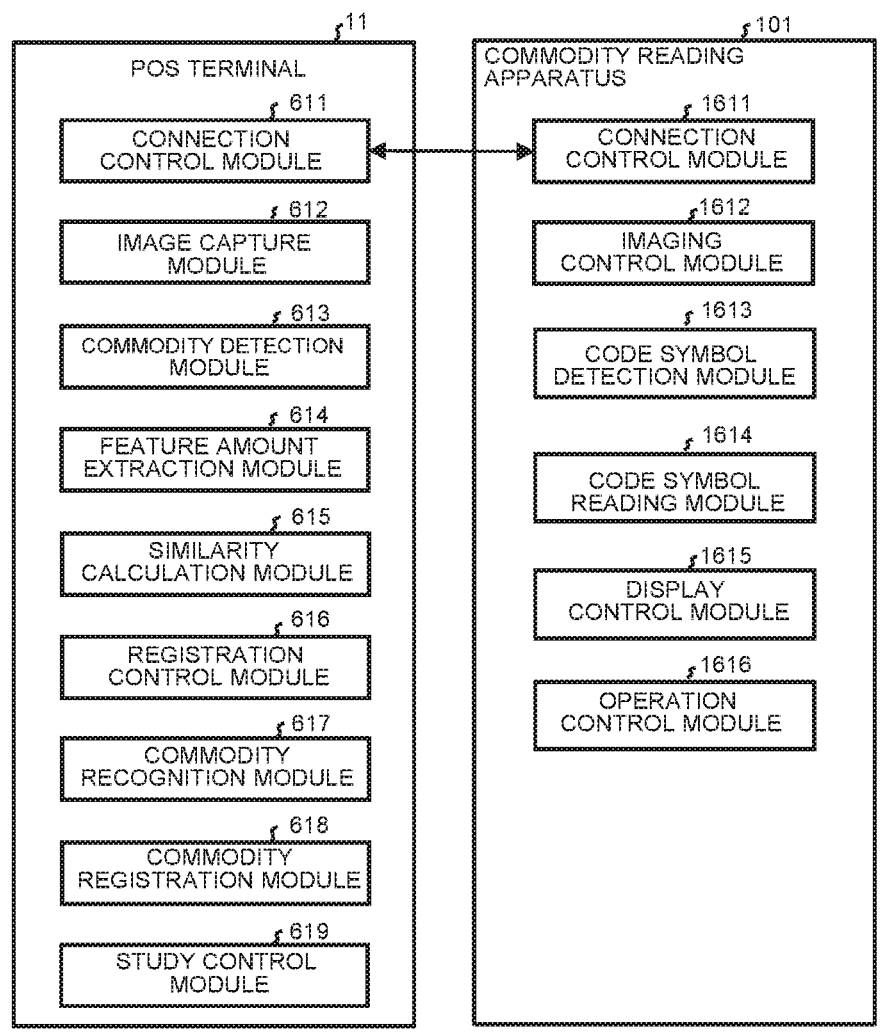
FIG. 4 is a block diagram showing a configuration of functions which the respective devices of the checkout system have.
Figure 5:
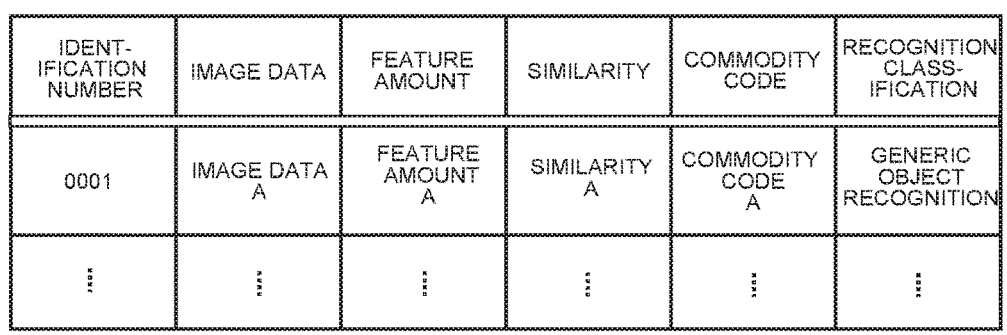
FIG. 5 is an explanation diagram showing an example of a data configuration of the image data table according to the embodiment.

The CPU 161 of the commodity reading apparatus 101 develops the control program 166 of the ROM 162 in the RAM 163, and operates in accordance with the control program 166, to generate respective function modules shown in FIG. 4 in the RAM 163. Specifically, the CPU 161 has a connection control module 1611, an imaging control module 1612, a code symbol detection module 1613, a code symbol reading module 1614, a display control module 1615, and an operation control module 1616, as the function modules.

The connection control module 1611 controls the connection interface 175 and the connection interface 176, to communicate with the POS terminal 11.

The imaging control module 1612 controls the imaging module 164, to make an imaging area to be imaged, and to make image data of the imaging area to be outputted. The imaging control module 1612 makes the imaging device 164 start an imaging operation, provided that the connection control module 1611 has accepted an imaging request. The imaging control module 1612 makes image data which the imaging device 164 has sequentially imaged and outputted, to be stored in the RAM 163. In addition, the imaging control module 1612 makes the connection control module 1611 output the image data which the imaging device 164 has sequentially imaged and outputted.

The code symbol detection module 1613 that is second detection means reads the image data stored in the RAM 163, provided that the image data imaged by the imaging device 164 has been stored in the RAM 163. And the code symbol detection module 1613 detects a code symbol contained in the image data.

The code symbol reading module 1614 reads a commodity code which the code symbol indicates, provided that the code symbol detection module 1613 has detected the code symbol. The code symbol reading module 1614 outputs the read commodity code to the POS terminal 11.

The display control module 1615 controls all or a part of the first display 106, and the second display 109, to make various screens to be displayed.

The operation control module 1616 controls all or a part of the touch panel 105, and the keyboard 107, to accept various operations.

The CPU 61 of the POS terminal 11 develops the control program 70 of the storage device 64 in the RAM 63, and operates in accordance with the control program 70, to generate respective function modules shown in FIG. 4 in the RAM 63. Specifically, the CPU 61 has a connection control module 611, an image capture module 612, a commodity detection module 613, a feature amount extraction module 614, a similarity calculation module 615, a registration control module 616, a commodity recognition module 617, a commodity registration module 618, and a study control module 619, as the function modules.

The connection control module 611 controls the connection interface 66, to communicate with the commodity reading apparatus 101.

The image capture module 612 makes the connection control module 611 output an imaging request which requests start of an imaging operation of the imaging device 164. And the image capture module 612 sequentially accepts inputs of the image data from the imaging device 164.

The commodity detection module 613 that is first detection means detects an article (a commodity) contained in the image data which the image capture module 612 has accepted. For example, the commodity detection module 613 detects whole or a part of the article contained in the image data, using a pattern matching technology or the like. Specifically, the commodity detection module 613 detects an outline or the like from an image obtained by binarizing the image data. The commodity detection module 613 detects an article based on the difference between an outline extracted from the previously prepared image data and the outline extracted from the image data of the detection object. Here, the previously prepared image data is image data obtained in such a manner that a background in which an article or the like is not contained is imaged and outputted by the imaging device 164. Accordingly, the commodity detection module 613 can detect an outline which is not present in the outline extracted from the previously prepared image data, from the outline extracted from the image data of the detection object, provided that an article is contained in the image data of the detection object. And the commodity detection module 613 detects the article based on the outline which is not present in the outline extracted from the previously prepared image data.

The feature amount extraction module 614 that is extraction means extracts a state of the surface, such as a color shade and a concave/convex state the surface, of the article which the commodity detection module 613 has detected from the image data which the imaging device 164 has imaged and outputted, as a feature amount.

The similarity calculation module 615 that is calculation means compares the feature amounts for collation of the commodities registered in the PLU file 71 with the feature amount of the commodity which the feature amount extraction module 614 has extracted, to calculate similarities to the respective feature amounts for collation of the commodities registered in the PLU file 71. Here, the similarity indicates in what degree whole or a part of the article is similar to the commodity for collation, when the feature amount for collation of the commodity stored in the PLU file 71 is 100% (similarity: 1.0). In addition, the similarity calculation module 615 may calculate similarities of an article by changing weightings with respect to the color shade and the concave/convex state of the surface, for example.

To recognize an object contained in the image data in this manner is called generic object recognition. Regarding the generic object recognition like this, various recognition technologies are explained in the document described below.

Keiji YANAI, "The current State and Future Directions on Generic Object Recognition", Academic Journal of Information Processing Societies of Japan, Vol. 48, No. SIG 16, [Searched on Apr. 29, 2016], Internet <URL: http://mm.cs.uec.ac.jp/IPSJ-TCVIM-Yanai.pdf>

In addition, a technology to perform generic object recognition by performing area division of image data for each object is explained in the document described below.

Jamie Shotton et al., "Semantic Texton Forests for Image Categorization and Segmentation", [Searched on Apr. 29, 2016], Internet <URL: http://citeseerx.ist.psu.edu/viewdoc/download?doi=10.1.1.145.3036&rep=rep1&type=pdf>

In addition, a calculation method of similarities between the feature amounts for collation of various commodities registered in the PLU file 71, and the feature amount of the commodity which the feature amount extraction module 614 has extracted does not matter in particular. For example, the similarity calculation module 615 may calculate similarities between the feature amounts for collation of the commodities registered in the PLU file 71, and the feature amount of the commodity which the feature amount extraction module 614 has extracted as absolute evaluation, or may calculate the similarities as relative evaluation.

In addition, the similarity calculation module 615 calculates similarities regardless of the recognition classification of the PLU file 71. That is, the similarity calculation module 615 also calculates similarities between the feature amount which the feature amount extraction module 614 has extracted and the feature amounts for collation of the commodities whose recognition classification is the code symbol recognition.

The registration control module 616 makes the image data and so on which the imaging device 164 has imaged and outputted to be stored in the image data table 72. Here, Fig. is an explanation diagram showing an example of a data configuration of the image data table 72. The image data table stores an identification number, image data, a feature amount, a similarity, a commodity code, and a recognition classification, in association with each other. The identification number is identification information which can identify the information stored in the image data table 72. The image data is image data which the image capture module 612 has accepted. That is, the image data is image data which has been used for generic object recognition of an article (a commodity) contained in the image data. The feature amount is a feature amount which the feature amount extraction module 614 has extracted regarding the article contained in the above-described associated image data. The similarity is the highest similarity out of the similarities of the feature amount of the article contained in the above-described associated image data and the feature amounts for collation of various commodities registered in the PLU file 71. The commodity code is a commodity code of the commodity having the highest similarity. The recognition classification is recognition classification of the commodity having the highest similarity. The registration control module 616 sequentially stores the image data, the feature amount, the similarity and so on in the image data table 72, each time image data is captured for one article (commodity). And the registration control module 616 deletes the image data and so on which are made to be stored in the image data table 72, provided that the commodity has been subjected to sales registration. In addition, the registration control module 616 may make the image data, the feature amount, the similarity, and the commodity code to be stored not in the same data table, but may make them to be stored in respective different data tables.

Returning to FIG. 4, the commodity recognition module 617 that is recognition means recognizes what of the commodities stored in the PLU file 71 the article contained in the image data corresponds to, based on the similarity stored in the image data table 72. And the commodity recognition module 617 selects the corresponding commodity from the PLU file 71. The commodity recognition module 617 selects the corresponding commodity from the PLU file 71, while classifying it in three stages of a determined commodity, a commodity candidate, and a non-recognizable article in accordance with the similarity stored in the image data table 72. In addition, the above-described classification in accordance with the similarity is an example, and the classification may be made by another method.

However, the commodity recognition module 617 that is selection means selects the commodity which the commodity recognition module 617 has recognized as the commodity which the imaging device 164 has imaged from the PLU file 71, provided that the recognition classification of the recognized commodity is the generic object recognition. That is, the commodity recognition module 617 excludes a commodity whose recognition classification is the code symbol recognition in the PLU file 71 from a selection candidate. The commodity recognition module 617 does not select a commodity whose recognition classification is the code symbol recognition, to prevent that a commodity which is to be recognized by the code symbol recognition has been erroneously recognized by the generic object recognition.

The commodity recognition module 617 determines, regarding the same commodities in which the recognition classification is set to the generic object recognition, whether or not a prescribed number or more of similarities having not less than a first threshold value have been registered in the image data table 72, as a first condition. The commodity recognition module 617 selects the commodity corresponding to the article which the commodity detection module 613 has detected from the PLU file 71, as a determined commodity, provided that the first condition is satisfied.

The determined commodity is a commodity which can be automatically registered, based on the similarity stored in the image data table 72, without requiring a confirmation operation by an operator. The automatic registration is a processing to perform sales registration of the determined commodity as a commodity of the sales object, without requiring a confirmation operation by an operator. And the commodity recognition module 617 outputs the commodity code of the determined commodity to the commodity registration module 618. In addition, the commodity recognition module 617 does not select the commodity whose recognition classification is the code symbol recognition as a determined commodity, even if the first condition is satisfied.

In addition, the commodity recognition module 617 determines, regarding the same commodities in which the recognition classification is set to the generic object recognition, whether or not a prescribed number or more of similarities having not less than a second threshold value have been registered in the image data table 72, as a second condition, provided that the first condition is not satisfied. In addition, it is decided that the second threshold value is lower than the first threshold value. The commodity recognition module 617 selects one or a plurality of commodities corresponding to the article which the commodity detection module 613 has detected from the PLU file 71, as commodity candidates, provided that the second condition is satisfied.

The commodity candidate is a commodity that is recognized as the commodity to which the article imaged by the imaging device 164 corresponds, based on the similarity stored in the image data table 72, and also is required for a confirmation operation that the relevant commodity is the commodity corresponding to the article which the imaging device 164 has imaged by an operator. That is, the commodity candidate is a candidate for a commodity corresponding to the article which the imaging device 164 has imaged and outputted. And the commodity candidate is subjected to sales registration as a commodity of the sales object, by a confirmation operation by an operator to select a corresponding commodity from one or a plurality of the commodity candidates. And the commodity recognition module 617 outputs the commodity code of the commodity selected from the commodity candidate to the commodity registration module 618. In addition, the commodity recognition module 617 does not select the commodity whose recognition classification is the code symbol recognition as a commodity candidate, even if the second condition is satisfied.

In addition, the commodity recognition module 617 determines the commodity corresponding to the article which the commodity detection module 613 has detected as non-recognizable, provided the second condition is not satisfied. The commodity recognition module 617 does not select the commodity information from the PLU file 71, provided that the relevant commodity is determined as non-recognizable.

The commodity recognition module 617 recognizes to what commodity of the code symbol recognition the relevant commodity corresponds, even if the recognition classification of the relevant commodity is the code symbol recognition as described above. By this means, the commodity recognition module 617 can reduce cases in which a commodity of the code symbol recognition might be erroneously recognized as a commodity of the generic object recognition.

Hereinafter, the description will be made by citing an example. A case in which a commodity A of the generic object recognition is similar to a commodity B of the code symbol recognition, and the commodity B has been imaged by the imaging device 164 will be described. For example, when the feature amount for collation of the commodity B whose recognition classification is the code symbol recognition is not stored in the PLU file 71, since the commodity A is similar to the commodity B, the similarity calculation module 615 determines that an article (commodity B) imaged by the imaging device 164 is similar to the commodity A. At this time, since a commodity similar to the above-described imaged article (commodity B) is only the commodity A, the similarity calculation module 615 might calculate a high similarity for the commodity A. Accordingly, the commodity recognition module 617 might erroneously recognize that the commodity A is a determined commodity or a commodity candidate. On the other hand, when the feature amount for collation of the commodity A whose recognition classification is the generic object recognition and the feature amount for collation of the commodity B whose recognition classification is the code symbol recognition are stored in the PLU file 71, as shown in FIG. 3, the similarity calculation module 615 determines that the above-described imaged article (commodity B) is similar to the commodity A or the commodity B. At this time, commodities similar to the above-described imaged article (commodity B) are the commodity A and the commodity B in the PLU file 71, the similarity calculation module 615 calculates a relatively lower similarity for the commodity A, compared with a case in which the similar commodity is only the commodity A. Accordingly, it becomes difficult for the commodity recognition module 617 to erroneously recognize that the commodity A is the determined commodity or the commodity candidate.

And when the determined commodity or the commodity candidate is not selected, and when the commodity of the code symbol recognition is recognized, the POS terminal 11 executes generic object recognition, using image data which the imaging device 164 has newly imaged and outputted. On the other hand, the commodity reading apparatus 101 executes a processing to detect a code symbol, using the image data which the imaging device 164 has newly imaged and outputted. That is, the code symbol detection module 1613 executes a processing for detecting a code symbol to the image data which the imaging device 164 has newly imaged and outputted, provided that the commodity which the commodity recognition module 617 has recognized is the commodity of the code symbol recognition. The code symbol reading module 1614 reads the code symbol, provided that the code symbol detection module 1613 has detected the code symbol. Accordingly, the commodity recognition module 617 does not select the determined commodity or the commodity candidate, provided that the relevant commodity has been recognized as the commodity of the code symbol recognition, and thereby it becomes possible to recognize a commodity by a code symbol in the next image data.

In addition, the connection control module 611 may notify that the relevant commodity is the commodity of the code symbol recognition to the commodity reading apparatus 101, provided that the commodity recognition module 617 has recognized the commodity of the code symbol recognition. In this case, the display control module 1615 of the commodity reading apparatus 101 makes the first display 106 and so on display that the commodity of the code symbol recognition has been recognized. By this means, the display control module 1615 can urge that a position to which the code symbol is attached is faced toward the imaging device 164 and is imaged.

The commodity registration module 618 performs sales registration of the designated commodity as the commodity of the sales object. That is, the commodity registration module 618 reads the commodity information of the commodity of the sales object from the PLU file 71 and registers it. For example, the commodity registration module 618 performs sales registration of the commodity designated by the commodity code outputted from the commodity recognition module 617 as the commodity of the sales object. Or the commodity registration module 618 performs sales registration of the commodity of the commodity code outputted from the code symbol reading module 1614 as the commodity of the sales object.

The study control module 619 that is storage control means executes a study processing, regarding the commodity whose recognition classification stored in the image data table 72 is the code symbol recognition. Here, the study processing is a processing to make the feature amount and so on of the commodity whose recognition classification stored in the image data table 72 is the code symbol recognition, to be stored as the feature amount for collation of the corresponding commodity in the PLU file 71. Or the study processing is a processing to make the feature amount and so on of the commodity whose recognition classification stored in the image data table 72 is the code symbol recognition, to be stored as the feature amount for collation of the above-described corresponding commodity in storage device 64 and so on. In addition, the information to be stored in the PLU file is not limited to the feature amount. For example, the image data and so on may be included in the information to be stored in the PLU file 71.

The study control module 619 may impose a condition on an object of the study processing. For example, the study control module 619 may impose, as the condition, that the similarity of the commodity whose recognition classification stored in the image data table 72 is the code symbol recognition is not less than a third threshold value. In this case, the study control module 619 makes the feature amount and so on of the commodity having the similarity of not less than the third threshold value, out of the commodities in which recognition classification stored in the image data table 72 is the code symbol recognition, to be stored in the PLU file 71. The study control module 619 imposes the condition on the object of the study processing, to prevent that the feature amount of the commodity of the generic object recognition might erroneously be stored as the feature amount of the commodity of the code symbol recognition, or a feature amount and so on which does not serve as a useful reference might be stored.

Figure 6:
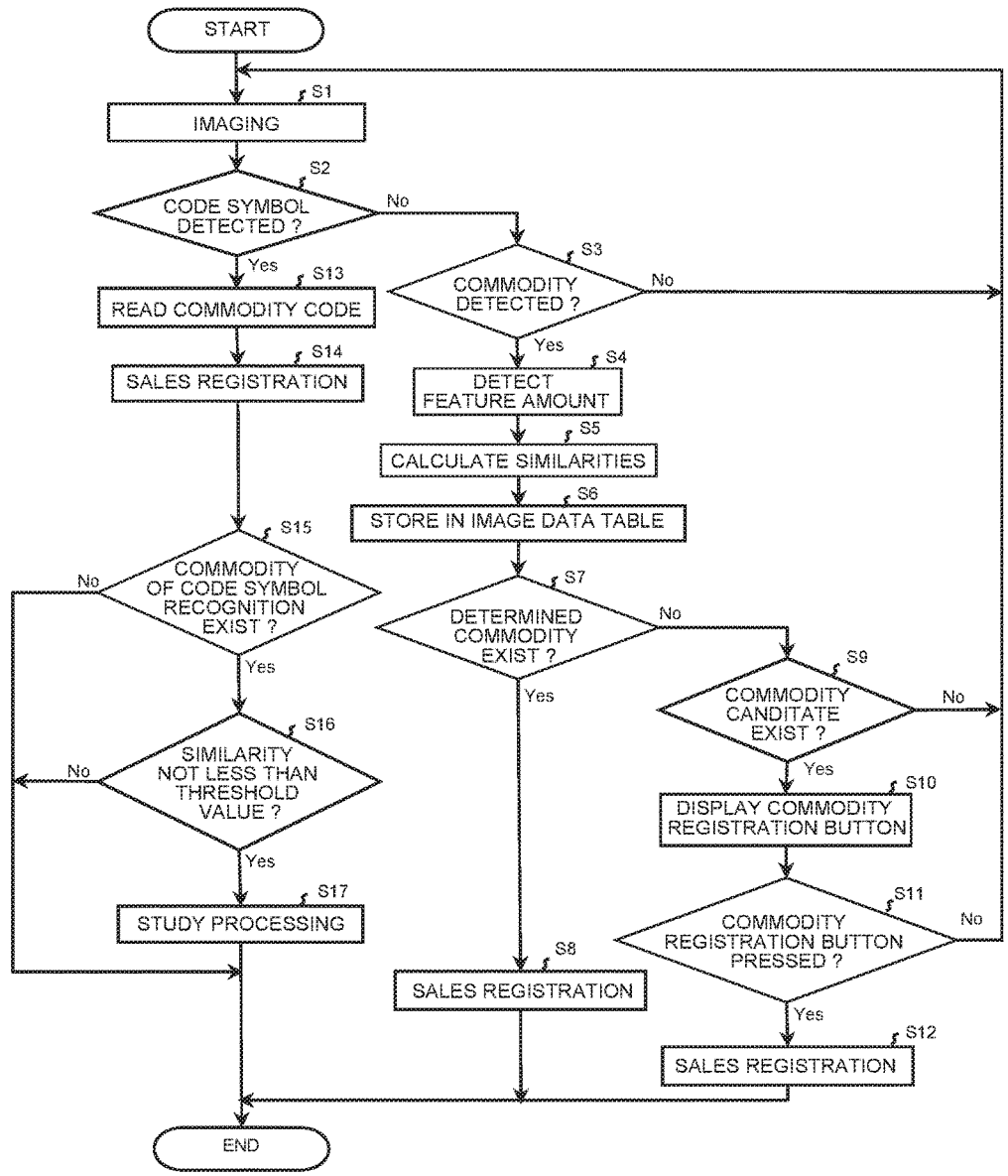
FIG. 6 is a flow chart diagram showing an example of a commodity registration processing of the checkout system according to the embodiment.

Next, a commodity registration processing which the respective devices of the checkout system 1 execute in cooperation will be described. Here, FIG. 6 is a flow chart diagram showing an example of a commodity registration processing which the respective devices of the checkout processing system 1 of the present embodiment execute in cooperation.

To begin with, in a step S1, the imaging control module 1612 of the commodity reading apparatus 101 makes the imaging device 164 perform imaging. Next, in a step S2, the code symbol detection module 1613 of the commodity reading apparatus 101 determines whether or not a code symbol can be detected from the image data which the imaging device 164 has imaged.

Provided that a code symbol cannot be detected from the image data (No, in step S2), the processing of the checkout system 1 transfers to a step S3. In the step S3, the commodity detection module 613 of the POS terminal 11 determines whether or not a commodity can be detected from the image data which the imaging device 164 has imaged. Provided that a commodity cannot be detected from the image data (No, in Step S3), the processing of the checkout system 1 transfers to the step S1.

Provided that a commodity has been able to be detected from the image data (Yes, in step S3), the processing of the checkout system 1 transfers to a step S4. In the step S4, the feature amount extraction module 614 of the POS terminal 11 extracts a feature amount of the commodity detected from the image data which the imaging device 164 has imaged.

Next, in a step S5, the similarity calculation module 615 of the POS terminal 11 compares the extracted feature amount with the respective feature amounts for collation of the commodities stored in the PLU file 71, to calculate similarities of the respective commodities.

Next, in a step S6, the registration control module 616 of the POS terminal 11 makes the image data, the feature amount, the similarity, the commodity code of the commodity having the highest similarity, and the recognition classification of the commodity to be stored in the image data table 72.

Next, in a step S7, the commodity recognition module 617 of the POS terminal 11 determines whether or not a commodity corresponding to the article contained in the image data can be selected from the PLU file 71 as a determined commodity.

Provided that a commodity corresponding to the article contained in the image data can be selected from the PLU file 71 as a determined commodity (Yes, in step S7), the processing of the checkout system 1 transfers to a step S8. In the step S8, the commodity registration module 618 of the POS terminal performs sales registration of the selected determined commodity as a commodity of the sales object. And the checkout system 1 finishes the commodity registration processing.

On the other hand, provided that a commodity corresponding to the article contained in the image data cannot be selected from the PLU file 71 as a determined commodity (No, in step S7), the processing of the checkout system 1 transfers to a step S9. In the step S9, the commodity recognition module 617 of the POS terminal 11 determines whether or not a commodity corresponding to the article contained in the image data can be selected from the PLU file as a commodity candidate. Provided that a commodity corresponding to the article contained in the image data cannot be selected from the PLU file 71 as a commodity candidate (No, in step S9), the processing of the checkout system 1 transfers to the step S1.

On the other hand, provided that a commodity corresponding to the article contained in the image data can be selected from the PLU file 71 as a commodity candidate, (Yes, in step S9), the processing of the checkout system 1 transfers to a step S10. In the step S10, the display control module 1615 of the commodity reading apparatus 101 displays a commodity registration button for performing sales registration of the selected commodity candidate on a commodity registration screen.

Next, in a step S11, the commodity registration module 618 of the POS terminal 11 determines whether or not the commodity registration button has been pressed. Provided that the commodity registration button has not been pressed (No, in step S11), the processing of the checkout system 1 transfers to the step S1.

On the other hand, provided that the commodity registration button has been pressed (Yes, in step S11), the processing of the checkout system 1 transfers to a step S12. In the step S12, the commodity registration module 618 of the POS terminal 11 performs sales registration of a commodity associated with the commodity registration button as a commodity of the sales object. And the checkout system 1 finishes the commodity registration processing.

In the step S2, provided that a code symbol has been able to be detected from the image data (Yes, in step S2), the processing of the checkout system 1 transfers to a step S13. In the step S13, the code symbol reading module 1614 of the commodity reading apparatus 101 reads a commodity code from the detected code symbol.

Next, in a step S14, the commodity registration module 618 of the POS terminal 11 performs sales registration of a commodity to be designated by the read commodity code.

Next, in a step S15, the study control module 619 of the POS terminal 11 determines whether or not the commodity of the code symbol recognition, that is the commodity designated in the step S14, is stored in the image data table 72. Provided that the commodity of the code symbol recognition is not stored (No, in step S15), the checkout system 1 finishes the commodity registration processing.

On the other hand, provided that the commodity of the code symbol recognition is stored (Yes, in step S15), the processing of the checkout system 1 transfers to a step S16. In the step S16, the study control module 619 of the POS terminal 11 determines whether or not the similarity of the commodity of the code symbol recognition is not less than a threshold value. Provided that the similarity is less than the threshold value (No, in step S16), the checkout system 1 finishes the commodity registration processing.

On the other hand, provided that the similarity is not less than the threshold value (Yes, in step S16), the processing of the checkout system 1 transfers to a step S17. In the step S17, the study control module 619 of the POS terminal 11 adds the feature amount and so on of the commodity of the code symbol recognition having the similarity not less than the threshold value in the image data table 72 to the PLU file 71.

By the above-described processings, the POS terminal 11 finishes the commodity sales registration processing.

As described above, according to the checkout system 1 according to the present embodiment, the PLU file 71 stores a feature amount for collation, a recognition classification and so on in association with each other, for each commodity. And the similarity calculation module 615 calculates similarities of the commodity to the respective feature amounts for collation, regardless of the recognition classification of the commodity. Accordingly, when the imaging device 164 has imaged a commodity whose recognition classification is the code symbol recognition, the similarity calculation module 615 calculates a high similarity for the commodity in which the above-described imaged recognition classification is the code symbol recognition. In other words, the similarity calculation module 615 calculates a lower similarity for a commodity whose recognition classification is the generic object recognition, compared with a case in which a feature amount for collation of a commodity whose recognition classification is the code symbol recognition is not registered in the PLU file 71. By this means, since a similarity to an erroneous commodity becomes relatively low, it becomes difficult for the commodity recognition module 617 to select a commodity of the code symbol recognition as a determined commodity or a commodity candidate from the PLU file 71. Accordingly, the checkout system 1 according to the present embodiment can properly recognize an object article.

The above-described embodiment has been described as a case in which an information processing apparatus is applied to the POS terminal 11 for example. However, an information processing apparatus may be applied to the commodity reading apparatus 101. In addition, regarding the respective functions (the connection control module 611, the image capture module 612, the commodity detection module 613, the feature amount extraction module 614, the similarity calculation module 615, the registration control module 616, the commodity recognition module 617, the commodity registration module 618, and the study control module 619) which the POS terminal 11 has, and the respective functions (the connection control module 1611, the imaging control module 1612, the code symbol detection module 1613, the code symbol reading module 1614, the display control module 1615, and the operation control module 1616) which the commodity reading apparatus 101 has, any one of the POS terminal 11 and the commodity reading apparatus 101 may have all these functions collectively. Or regarding the respective functions which the POS terminal 11 has, and the respective functions which the commodity reading apparatus 101 has, devices which are not shown in the above-described embodiment may have these functions separately. Further, the commodity reading apparatus 101 may have the respective functions which the POS terminal 11 has, or the POS terminal may have the respective functions which the commodity reading apparatus 101 has.

In addition, the above-described embodiment has been described as the data for collation is a feature amount, but the data for collation may be an imaged commodity image (reference image).

In addition, in the above-described embodiment, an information processing apparatus has been applied to the checkout system 1 having the POS terminal 11 and the commodity reading apparatus 101. However, without being limited to this, an information processing apparatus may be applied to an apparatus with a single device configuration having functions of the POS terminal 11 and the commodity reading apparatus 101. As an apparatus with a single device configuration which is provided with the functions of the POS terminal 11 and the commodity reading apparatus 101, a self checkout apparatus (hereinafter, referred to simply as a self POS) which is installed and used in a store such as a supermarket can be cited.

Figure 7:
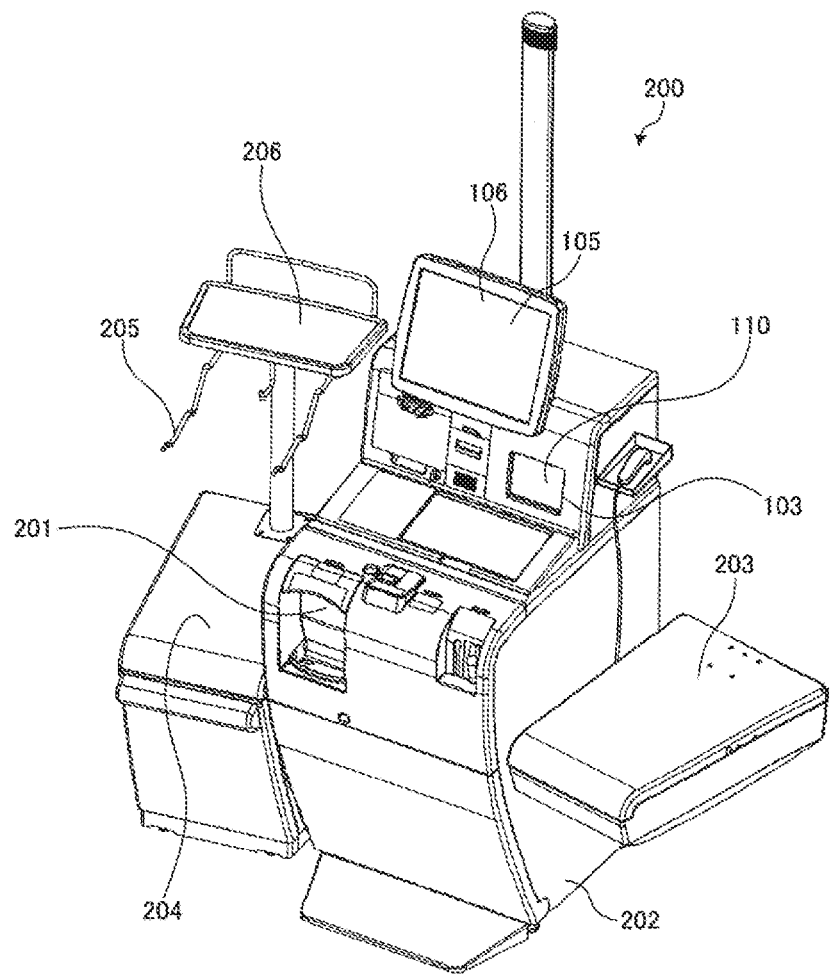
FIG. 7 is a perspective view showing an example of a configuration of a self POS according to an embodiment.
Figure 8:
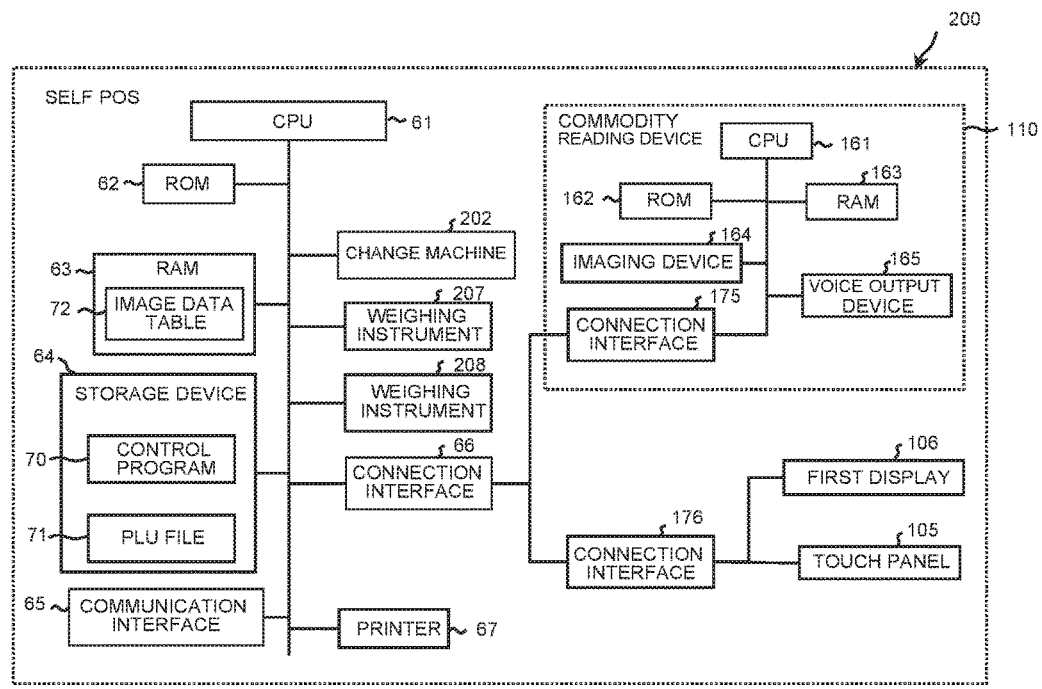
FIG. 8 is a block diagram showing an example of a hardware configuration of the self POS according to the embodiment.

Here, FIG. 7 is a perspective view showing an example of a configuration of a self POS 200. FIG. 8 is a block diagram showing an example of a hardware configuration of the self POS 200. In addition, hereinafter, the same configurations as those shown in FIG. 1 and FIG. 2 are shown with the same symbols, and the duplicated description thereof will be omitted. As shown in FIG. 7 and FIG. 8, a main body 202 of the self POS 200 has the first display 106 on the surface of which the touch panel 105 is arranged, and the commodity reading device 110 which reads a commodity image so as to recognize (detecting) classification and so on of a commodity.

The first display 106 is a liquid crystal display, for example. The first display 106 displays a guide screen for notifying a customer of an operation method of the self POS 200, various input screens, and a registration screen for displaying the commodity information read by the commodity reading device 110. Or, the first display 106 displays a total amount of commodities, a deposit amount, a change amount and so on, and displays a settlement screen for selecting a payment method.

A customer puts a code symbol attached to a commodity over the reading window 103 of the commodity reading device 110, and thereby the commodity reading device 110 reads the code symbol by the imaging device 164.

In addition, the self POS 200 has a commodity placing table 203 at the right side of the main body 202 for placing an unsettled commodity housed in a basket. The self POS 200 has a commodity placing table 204 at the left side of the main body 202 for placing a settled commodity. The commodity placing table 204 has a bag hooking hook 205 for hooking a bag for housing the settled commodity, and a temporarily placing table 206 for temporarily placing the settled commodity before putting it in the bag. The commodity placing tables 203, 204 are respectively provided with weighing instruments 207, 208, and they have a function to confirm that the weights of the commodity before and after the settlement are the same.

In addition, the main body 202 of the self POS 200 has a change machine 201 for receiving a bill for settlement and for accepting a change bill.

The self POS 200 with the configuration like this is applied to the checkout system 1, the self POS 200 comes to function as an information processing apparatus.

The program to be executed in each of the devices of the above-described embodiments and the modifications is provided while being previously incorporated in a storage medium (a ROM or a storage device) which the each device has, but is not limited to this. For example, the program may be provided while being recorded in a computer readable recording medium, such as a CD-ROM, a flexible disk (FD), a CD-R, a DVD (Digital Versatile Disk) in a file of an installable format or an executable format. Further, the storage medium is not limited to a medium independent from a computer or an incorporated system, but a storage medium which stores or temporarily stores a program transmitted by a LAN, Internet or the like by downloading is also included.

In addition, the program to be executed in each of the devices of the above-described embodiments and the modifications may be configured to be stored on a computer connected to a network such as Internet, and to be provided by being downloaded through the network, and the program may be configured to be provided or distributed via a network such as Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A recognition system, comprising:
an imaging device which images a prescribed imaging area and outputs image data;
a storage device which stores a commodity file including identification information for a plurality of commodities, feature values for the plurality of commodities, and a predetermined recognition classification for each commodity in the plurality indicating the commodity is one of a first commodity type or a second commodity type, the first commodity type being commodities to be recognized using a code symbol associated with the commodity in the commodity file and the second commodity type being commodities to be recognized using a feature value associated with the commodity in the commodity file; and
a processor which is configured to:
determine whether a code symbol can be detected in the image data from the imaging device,
detect an article in the image data from the imaging device if a code symbol cannot be detected in the image data,
extract a feature value of the detected article from the image data,
calculate similarities between the stored feature values in the commodity file for commodities of the first commodity type and the second commodity type and the extracted feature value,
recognize commodities in the commodity file as candidates corresponding to the detected article based on the calculated similarities,
exclude commodities of the first commodity type from the candidates based on the predetermined recognition classification included in the commodity file, and
select a commodity from the candidates as a recognized commodity based on calculated similarity provided that the calculated similarity for the commodity is above a threshold value.

2. The recognition system according to claim 1, wherein the processor comprises a first processor and a second processor,
the first processor is configured to determine whether the code symbol can be detected in the image data from the imaging device, and
the second processor is configured to detect the article in the image data from the imaging device if the code symbol cannot be detected in the image data,
extract the feature value of the detected article from the image data,
calculate the similarities between the stored feature values in the commodity file for commodities of the first commodity type and the second commodity type and the extracted feature value,
recognize the commodities in the commodity file as candidates corresponding to the detected article based on the calculated similarities,
exclude commodities of the first commodity type from the candidates based on the predetermined recognition classification includes in the commodity file, and
select the commodity from the candidates as the recognized commodity based on the calculated similarity provided that the calculated similarity for the commodity is above a threshold value.

3. The recognition system according to claim 2, wherein the second processor detects the code symbol in the image data.

4. The recognition system according to claim 3, wherein:
the first processor decodes the code symbol.

5. The recognition system according to claim 1, wherein:
the processor stores the extracted feature value in the storage device when the detected article is a commodity of the first commodity type.

6. The recognition system according to claim 5, wherein:
the processor stores the extracted feature value in the storage device as the feature value of a commodity in the commodity file when the calculated similarity is at or above a prescribed threshold value.

7. An information processing apparatus, comprising:
an interface to receive image data;
a storage device which stores a commodity file including identification information for a plurality of commodities, feature values for the plurality of commodities, and a predetermined recognition classification for each commodity in the plurality indicating the commodity is one of a first commodity type or a second commodity type, the first commodity type being commodities to be recognized using a code symbol associated with the commodity in the commodity file and the second commodity type being commodities to be recognized using a feature value associated with the commodity in the commodity file; and
a processor which is configured to:
determine whether a code symbol can be detected in the image data,
detect an article in the image data if a code symbol cannot be detected in the image data
extract a feature value of the detected article from the image data,
calculate similarities between the stored feature values in the commodity file for commodities of the first commodity type and the second commodity type and the extracted feature value,
recognize commodities in the commodity file as candidates corresponding to the detected article based on the calculated similarities,
exclude commodities of the first commodity type from the candidates based on the predetermined recognition classification included in the commodity file, and
select a commodity from the candidates as a recognized commodity based on calculated similarity provided that the calculated similarity for the commodity is above a threshold value.

8. The information processing apparatus according to claim 7, wherein:
the processor stores the extracted feature value in the storage device when the detected article is a commodity of the first commodity type.

9. The information processing apparatus according to claim 8, wherein:
the processor stores the extracted feature value in the storage device as the feature value of a commodity in the commodity file when the calculated similarity is at or above a prescribed threshold value.

10. An information processing method for an information processing apparatus having an interface to receive image data, a storage device which stores a commodity file including identification information for a plurality of commodities, feature values for the plurality of commodities, and a predetermined recognition classification for each commodity in the plurality indicating the commodity is one of a first commodity type or a second commodity type, the first commodity type being commodities to be recognized using a code symbol associated with the commodity in the commodity file and the second commodity type being commodities to be recognized using a feature value associated with the commodity in the commodity file, and a processor, the method comprising:
determining whether a code symbol can be detected in the image data,
detecting an article in the image data if a code symbol cannot be detected in the image data,
extracting a feature value of the detected article from the image data,
calculating similarities between the stored feature values in the commodity file for commodities of the first commodity type and the second commodity type and the extracted feature value,
recognizing commodities in the commodity file as candidates corresponding to the detected article based on the calculated similarities,
excluding commodities of the first commodity type from the candidates based on the predetermined recognition classification included in the commodity file, and
selecting a commodity from the candidates as a recognized commodity based on calculated similarity provided that the calculated similarity for the commodity is above a threshold value.

* * * * *